Jan. 4, 1955 W. L. MORGAN 2,698,595
SIGNALING MIRROR

Filed March 29, 1952 6 Sheets-Sheet 1

Inventor
Willard L. Morgan
By Nobbe & Swope
Attorneys

Jan. 4, 1955 W. L. MORGAN 2,698,595
SIGNALING MIRROR
Filed March 29, 1952 6 Sheets-Sheet 2

Inventor
Willard L. Morgan
By Nobbe & Swope
Attorneys

Jan. 4, 1955 W. L. MORGAN 2,698,595
SIGNALING MIRROR

Filed March 29, 1952 6 Sheets-Sheet 4

Inventor
Willard L. Morgan
Nobbe & Swope
Attorneys

United States Patent Office 2,698,595
Patented Jan. 4, 1955

2,698,595

SIGNALING MIRROR

Willard L. Morgan, Pittsburgh, Pa., assignor to Libbey-Owens-Ford Glass Company, Toledo, Ohio, a corporation of Ohio Application March 29, 1952, Serial No. 279,330

7 Claims. (Cl. 116—20)

This invention relates broadly to signaling devices for reflecting sunlight to desired targets, and particularly to an improved signaling mirror wherein the mirror is partially transparent and the signal reflected by said mirror is colored.

Signaling mirrors of this type are used principally by persons in distress for attracting the attention of potential rescuers at distances where normal means for doing so are inadequate. It is necessary that they be small, compact and simplified in construction. The mirror is held in such a manner that certain of the sun's rays strike the reflecting surface thereof and is then oriented or aimed in such a manner that the rays falling thereon are reflected to the target, or potential rescuers.

Thus, in a signaling mirror of this type there are two structural essentials. There must be a highly reflective mirror surface as well as means associated therewith for readily and accurately aiming a reflection from said surface at the target. The aiming means normally comprises a retroreflective surface positioned behind a clear space in the mirror for retroreflecting certain of the sun's rays striking the retroreflective surface to the eye of the observer or distressed party. The rays retroreflected present to the observer's eye a brilliant virtual image of the sun as seen through a small opening in said retroreflective surface, by means of which the observer is able to signal the target by superimposing the virtual image on the target in a manner well-known in the signaling mirror art. To counteract the brilliance of the virtual image, or aiming spot as used herein, a number of signaling mirrors of this type have incorporated therewith a partially transparent colored filter between said clear space and said retroreflective surface, such that the rays of the sun striking the retroreflective surface will take on the color of the filter and will therefore be retroreflected to the eye of the observer as a colored and less brilliant virtual image of the sun.

Of course, the above noted description is but a general one and is not intended to cover all known varieties of this type of signaling mirror. Nor is it meant to be illustrative of the novelty of this invention, but merely to present a background by which the improvements contained in the invention can be more readily appreciated.

It is an object of this invention to provide an improved signaling mirror wherein the attention of potential rescuers is attracted to a much greater degree.

Another object of this invention is to provide an improved signaling mirror wherein the observer is enabled to view the target at all times during the aiming of the mirror.

Still another object of this invention is to provide an improved signaling mirror wherein the aiming spot or virtual image is rendered partially transparent and less brilliant without the necessity of a colored filter element.

Still another object of this invention is to provide a signaling mirror which is simplified in construction and assembly.

Other objects and advantages of this invention will become more apparent during the course of the following description when taken in connection with the accompanying drawings.

It has been found that when conventional silver or aluminum backed mirrors are employed for reflecting sunlight, there is a tendency for the target or potential rescuer to mistake the signal for the natural reflectivity of metal objects. This has been found especially true when the mirrors are used at sea where it may be impossible to send a stationary signal. Thus, the signal under such circumstances may be a series of bright flashes similar to that which would be reflected by a metal object drifting at sea, or, for that matter, flying metal objects as a result of gunfire.

The disadvantages of a brilliant uncolored signal are therefore apparent. Not only is there the danger of the party in distress being ignored or overlooked but also, under wartime conditions, of being fired upon. This invention contemplates an improved signaling mirror wherein the conventional silver or aluminum backed mirror is replaced by a dichroic color reflecting mirror. Thus, the possibilities of mistake on the part of the target or party signaled are greatly reduced.

A further problem encountered in using mirrors of this type has been the relatively cumbersome and time consuming manner in which they have had to be operated. As mentioned previously, these mirrors are used principally by persons in distress, where time is a paramount factor, and frequently by those marooned at sea as well. The extreme difficulties of sighting through a relatively small opening and aiming through said opening onto an equally small target while in motion and/or in a period of a few moments can be readily appreciated.

The necessity of the small sighting opening is obvious to those skilled in the art, as is the necessity for placing the sighting eye close to but spaced from the opening during use thereof. Thus, the range of the sighting eye through the opening was severely limited and at the same time it was impossible to see around the edges of the mirror with the other eye as it was held close to the sighting eye. With the conventional opaque mirrors, it was a "hit and miss" method for the observer to aim the signal upon the moving target.

This invention then contemplates an improved signaling mirror wherein the mirror or reflecting surface is made semi-transparent by means of a partially transparent dichroic mirror. Thus, the observer may use both eyes and is enabled therby to view the entire range of the sky at all times during the aiming of the mirror and is in this manner able to more quickly locate the signal upon the target.

This invention contemplates further advantages by means of the replacement of the conventional mirror with the dichroic type. That is, this invention contemplates, in combination with a colored signal, a colored, partially transparent virtual image or aiming spot, which will reduce the brilliance inherent in said aiming spot and thereby enable the observer to signal the target in an improved manner. Heretofore, as previously mentioned, colored, partially transparent filters have been superimposed over the retroreflective surface for this purpose. This invention contemplates the advantages of a colored, partially transparent aiming spot without the necessity of a filter element. This is accomplished by extending the dichroic mirror coating over a part or all of the mirror surface behind which the retroreflective surface is located. By reason of color developed by the sun's rays in their transmission at least twice through the mirror in the area of the retroreflective surface covered by the coating, the aiming spot will take on a color which is different from that of the signal.

In the drawings, wherein like numerals are employed to designate like parts throughout the same.

Figure 1:
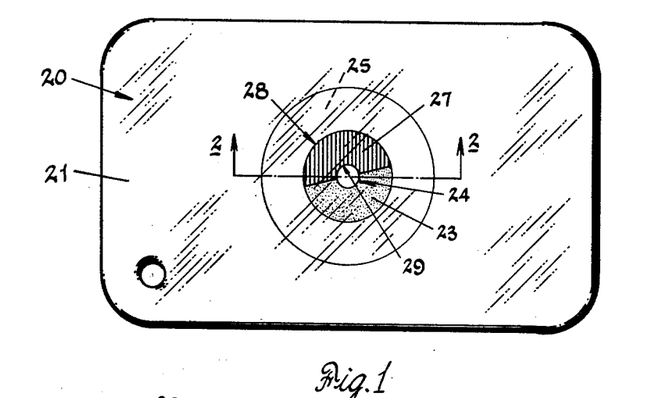
Fig. 1 is a plan view of one form of signaling mirror constructed in accordance with this invention.
Figure 3:
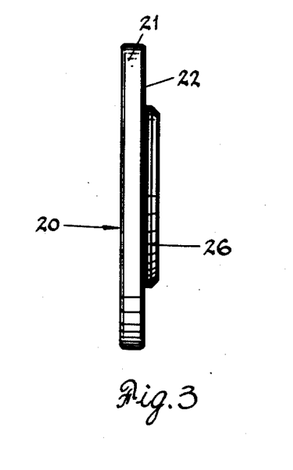
Fig. 3 is a side view of the signaling mirror of Fig. 1.

Referring now to the drawings, and particularly to Figs. 1 and 3, it can be seen that in plan the signaling mirror is substantially rectangular in plan and, as viewed from the side, relatively thin. Further, its rectangular dimensions are such that it is light and capable of being manipulated with one hand.

In each of the different forms of this invention, the reflecting surface consists of either a first or second surface partially transparent, visually colored dichroic mirror 20, the partially transparent mirror coating of which may, for example, be prepared as shown and described in Patents 2,430,452 and 2,519,546. For purposes of illustration, with the forms of signaling mirrors of this invention hereinafter described we may use a red reflecting, blue-green transmitting dichroic mirror which has the reflection and transmittance spectral characteristic shown in Fig. 19 wherein the wavelength of the spectral rays is shown in millimicrons. This mirror has an overall visible reflection value of 40% and a light transmission value of 60%. The two curves R and T show, respectively, the percentage of each various colored spectral ray which is reflected or transmitted. For the purposes of this invention, it is desirable that the colored mirror 20 have a fairly high reflectivity for a given range of wavelengths while having lower reflectivity for other visible wavelenths. As a further example, other dichroic mirrors may be used such as a mirror which reflects yellow rays at 550 millimicrons and transmits a purple color, made up of blue and red rays.

A dichroic mirror then means a mirror which reflects more of one color than others and transmits some or substantially all of those colors which are not reflected. Absorption of some colored rays may or may not be present to some degree, but the mirror is at least partially and visually transparent to some colored rays. Briefly, such a mirror consists of an ordinary transparent sheet of glass 21, onto at least a portion of one of the surfaces of which are placed one or more thin, partially transparent, reflective films to form a colored mirror coating 22 of the particular highly reflective type of mirror used for this purpose.

Figure 15:
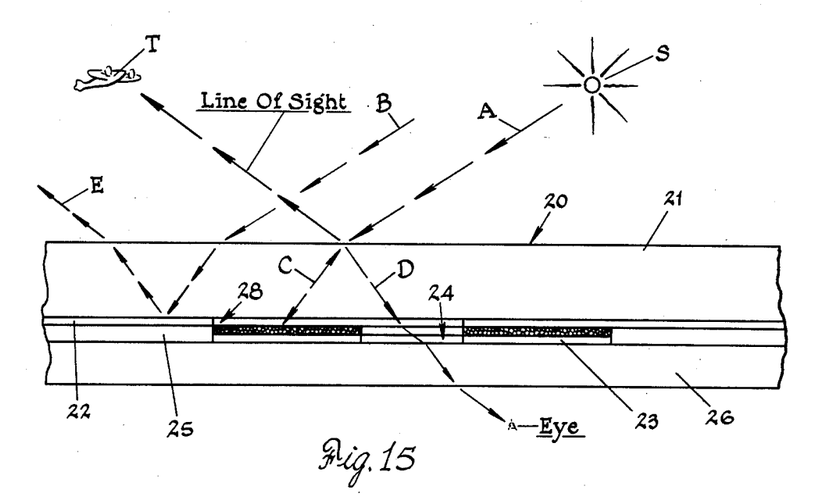
Figs. 15 to 18 show the manner of operating the signaling mirrors illustrated in Figs. 1 to 14.
Figure 19:
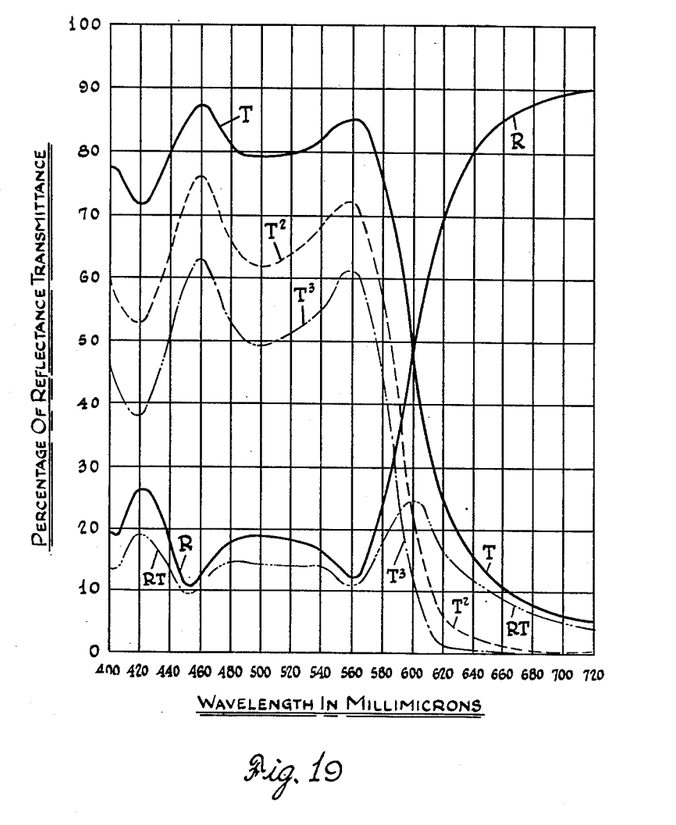
Fig. 19 is a graph illustrating the spectral reflection and transmission characteristics of a typical dichroic mirror, suitable for this invention, which is red reflecting and reflects a maximum of 90% at 720 millimicrons wavelength.

Colored reflection originate from the reflecting surfaces of the dichroic mirror due primarily to the interference of light rays and selective light absorption, as well known in the art and as fully explained in the aforementioned patents. Thus, in this instance in which the red reflecting mirror, the spectral characteristics of which are illustrated in Fig. 19, is used certain of the sun's rays B will be reflected as at E (Figs. 15 to 17) to the target T as a red signal. The light interference effects are dependent upon the thicknesses of the partially transparent mirror film or films and the number and nature thereof, it being necessary that alternate films have high and low refractive indices.

Specifically, the mirror of Fig. 19, in which the colors are formed by light interference, is prepared by forming on at least a portion of either the first or second surface of the glass sheet 21, by thermal evaporation as described in the aforementioned patents, a titanium dioxide film which is optically one-fourth of a wavelength of 720 millimicrons in thickness. Upon this first film there are deposited six alternate films comprising three of magnesium fluoride and three of titanium dioxide, each successive film being one-fourth of a wavelength in thickness based on 720 millimicrons. Thus, the dichroic mirror 20 herein illustrated consists of a glass sheet 21 onto either the first or second surface of which are placed seven alternate partially transparent films, beginning with one of titanium dioxide and being followed by six alternating films of magnesium fluoride and titanium dioxide immediately thereon.

Figure 11:
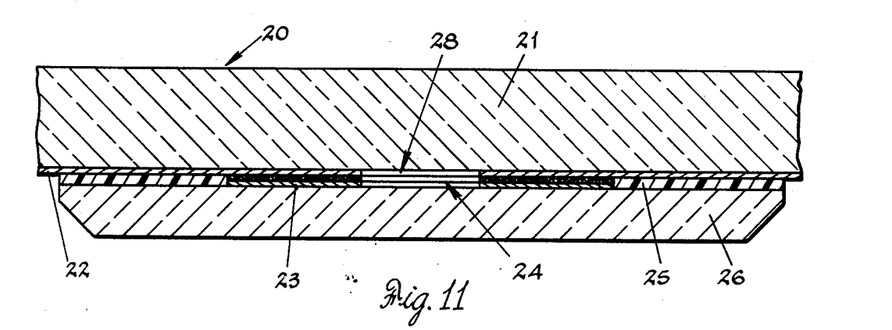
Fig. 11 is an enlarged sectional view taken substantially on line 11—11 of Fig. 10.
Figure 12:
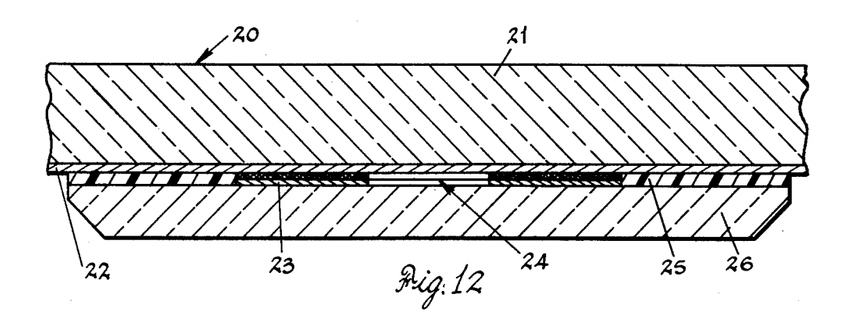
Figs. 12 to 14 are enlarged longitudinal sectional views of still other forms of signaling mirrors constructed in accordance with this invention.
Figure 13:
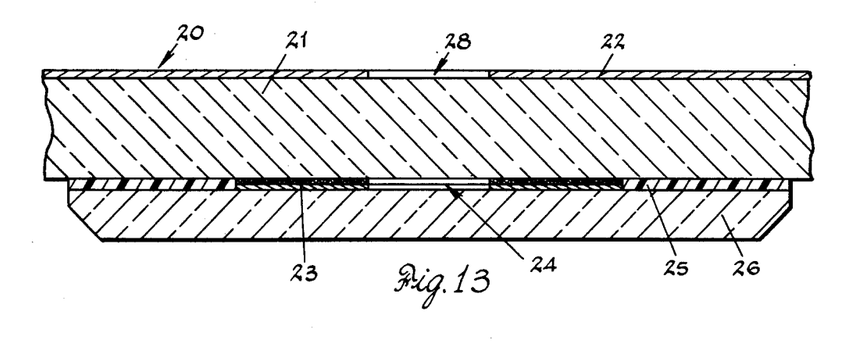
Figure 14:
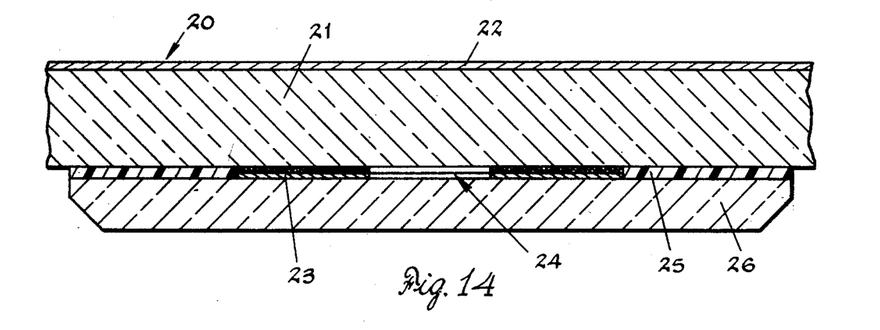

Also common to each of the forms of signaling mirrors of this invention, is a retroreflective surface 23 which is disposed in back of the coating 22 on either the second surface mirrors of Figs. 1 to 3 and 8 to 12 or the first surface mirrors of Figs. 13 and 14. In a manner well-known to the signaling mirror art and as previously mentioned, it is by means of retroreflective surface 23 that a virtual image of the sun S is retroreflected to the eye of an observer, by means of certain of sun's rays A (Figs. 15 to 17) and a plurality of other similar and parallel rays which are retroreflected as at C in striking said retroreflective surface and subsequently reflected from the front surface of the mirror as at D through an opening or sighting aperture 24 in said retroreflective surface.

Figure 6:
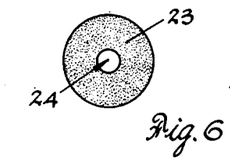
Figs. 6 and 7 are plan views of alternative types of retroreflective surfaces for the forms of signaling mirrors constructed in accordance with this invention.
Figure 7:
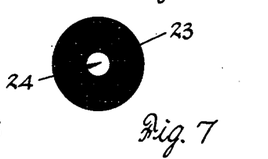

It has been found satisfactory to use, as a retroreflective surface 23, retroreflector sheets marketed by Minnesota Mining and Manufacturing Company under the trade name "Scotchlite" although it would be within the realm of this invention to use other products with similar characteristics. In any case, however, the surface is either a disc-like paper member into which are embedded or secured in any suitable manner individual "Scotchlite" type spherical beads having high angularity retroreflective surfaces, or a wire mesh screen in which case said beads are supported on the strands of said screen. The first-mentioned type of retroreflective surface is illustrated in the various forms of signaling mirrors as well as in Figs. 6. It is to be understood, of course, that the second-mentioned type, illustrated in Fig. 7, may be used alternatively with any of said forms of signaling mirrors.

Figure 18:
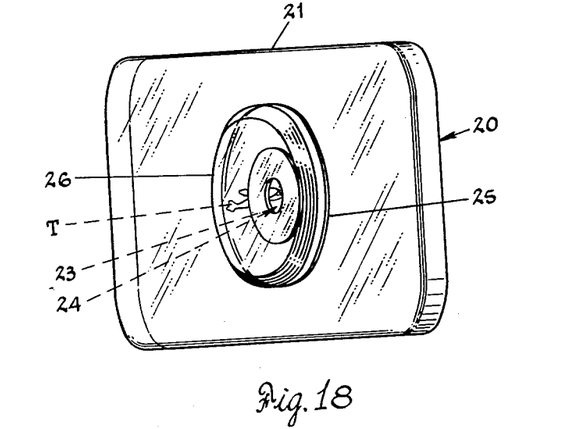

Surrounding and snugly receiving said retroreflective surface in each of the forms is a washer 25 of transparent thermoplastic resin, such as polyvinyl butyral, or other suitable bonding material. The washer is disposed adjacent and in back of the second surface of the mirror 20 and serves to space the retroreflective surface 23 between the mirror and a substantially cylindrical retaining plate 26 of any suitable transparent material, such as glass, disposed over and conforming to washer 25, as well as to provide an air-tight bond between said washer and mirror 20 and said retaining plate when assembled as a unit and subjected to heat and pressure. Thus, washer 25 and retaining plate 26 present a button-like projection from the back of mirror 20, as best shown in Figs. 3 and 18, although it is to be understood, of course, that said members may be rectangular so as to conform to the outer edges of mirror 20.

Figure 2:
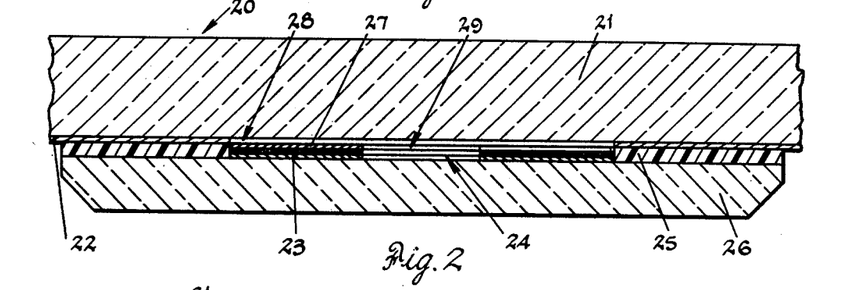
Fig. 2 is an enlarged sectional view taken substantially on line 2—2 of Fig. 1.
Figure 4:
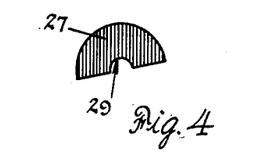
Figs. 4 and 5 are plan views of alternative types of separable filter elements for the signaling mirror of Figs. 1 to 3.
Figure 5:
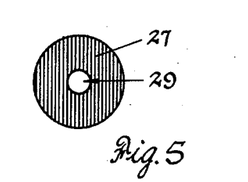

Dealing now with the different forms of the signaling mirrors of this invention and particularly that illustrated in Figs. 1 to 3, a colored filter element 27 may be used for reducing the brilliance of the virtual image of the sun retroreflected to the observer's eye, as aforementioned. Said filter element may be a separable, partially transparent, disc-like member of any bright color, such as either the split-ring filter of Fig. 4 or the whole ring of Fig. 5, in which case it is received within the washer 25 between a clear space or window 28 in a second surface dichroic mirror coating 22 and the retroreflective surface 23 so as to cover at least a portion of said retroreflective surface overlying said window. Alternatively, the partially transparent, colored filter element may be painted or stenciled onto at least a portion of the clear space or window 28 through the coating 22 so as to be integral therewith. The window conforms to the periphery of said retroreflective surface permitting the sun's rays to strike the partially transparent filter and said retroreflective surface without transmission through dichroic mirror coating 22. As well, a central opening 29 in the whole ring filter as well as a cut-out portion or notch in the split-ring filter conform to the sighting aperture 24 of retroreflective surface 23 as continuations thereof.

It has been found that while a colored filter element is advantageous in presenting a less brilliant and partially transparent virtual image to the eye of the observer, enabling him as previously noted to more accurately "pin-point" the image on the target, better results are obtained when a brilliant and uncolored image is used in the initial locating operation, before the virtual image has been accurately "pin-pointed" on said target. Thus, the split-ring or partial ring type filter may be used in such a manner, to be explained in detail subsequently, as to present a brilliant virtual image during the initial locating operation and, by means of a simple orientation, a less brilliant and partially transparent colored image during the "pin-pointing" or accurate superimposing operation. As will be more fully understood in connection with the detailed explanation of the operation of this form of signaling mirror, the partial ring type filter element may take on any shape or shapes which partially covers retroreflective surface 23 and surrounds sighting aperture 24 at least in part by means of notch or notches 29, so as to present adjacent covered and uncovered portions of said retroreflective surface in back of and overlying window 28.

Although it has been found advantageous in use with signaling mirrors of this type, it is to be understood that the filter element 27 may be eliminated entirely from the form of signaling mirror above described, in which case, of course, the virtual image would be brilliant and uncolored at all stages of the aiming operation. However, at that same time, one of the principal advantages of this form of signaling mirror, the colored signal, is attainable without a filter of any kind.

In the forms of signaling mirrors of this invention illustrated in Figs. 8 to 14, there is no colored filter element and yet the advantages noted previously which are derived from a filter element are preserved. That is to say, by the simple expedient of extending the dichroic mirror coating 22 over a part or all of the mirror surface behind which retroreflective surface 23 is located, a colored, partially transparent and less brilliant virtual image is caused to be presented to the eye of the observer by the transmission of certain of the sun's rays at least twice through said partially transparent dichroic mirror coating as said rays are retroreflected from said retroreflective surface to the eye of the observer.

Figure 8:
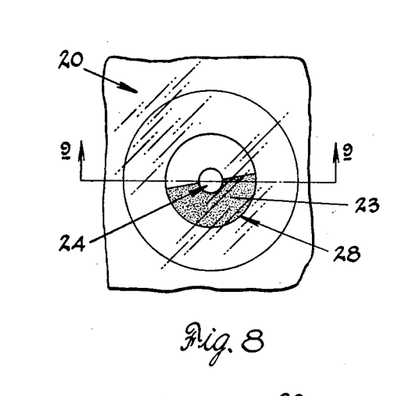
Fig. 8 is a fragmentary plan view of another form of signaling mirror constructed in accordance with this invention.
Figure 9:
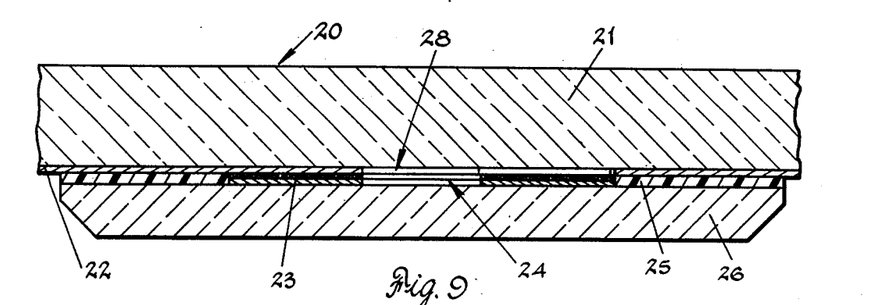
Fig. 9 is an enlarged sectional view taken substantially on line 9—9 of Fig. 8.

Dealing now specifically with the form illustrated in Figs. 8 to 11, it can be seen that second surface dichroic mirror coating 22 extends over either all or part of retroreflective surface 23. In the case of the form of Figs. 10 and 11, the retroreflective surface is entirely covered by the coating, and clear space or window 28 through said coating conforms to sighting aperture 24 in retroreflective surface 23 as a continuation thereof. In the form of Figs. 8 and 9, however, only a part of the retroreflective surface 23 is covered by the dichroic coating 22, and window 28 through said coating permits the remaining portion of said retroreflective surface to be left uncovered, the portion of coating 22 which covers said retroreflective surface conforming at least in part to sighting aperture 24 as a continuation thereof. Thus, as in the case of the form of signaling mirror shown in Figs. 1 and 2, in which the split ring type filter was used, there are adjacent covered and uncovered portions of retroreflective surface 23.

Figure 16:
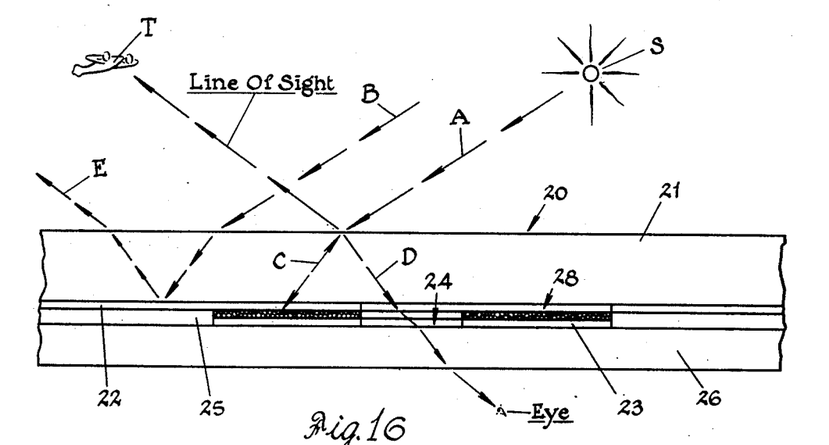

It can be seen from Fig. 16 that certain of the sun's rays A in being retroreflected by retroreflective surface 23 as at C will be transmitted twice through the dichroic mirror coating 22 before being reflected as at D from the front surface of mirror 20 to the eye of the observer, when a portion of said retroreflective surface covered by said coating is disposed toward the target and away from the sun. It has been found that when so transmitted in a red reflecting, blue-green transmitting dichroic mirror of the type illustrated in Fig. 19 and as described above, the retroreflected rays developed by means of such transmission are a deep-blue color, as represented by curve $T^2$ in the graph of Fig. 19. Thus, by the simple expedient of extending coating 22 over at least a portion of retroreflective surface 23, the virtual image can be made colored, partially transparent, and less brilliant without the use with a signaling mirror of a colored filter element.

Figure 10:
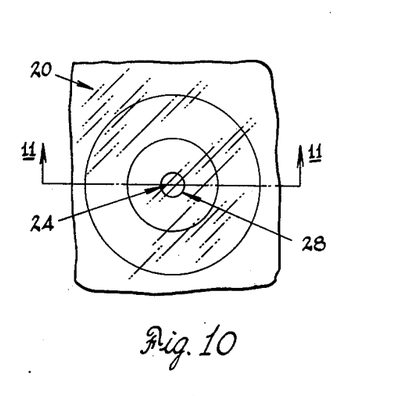
Fig. 10 is a fragmentary plan view of still another form of signaling mirror constructed in accordance with this invention.

Of course, in the form of signaling mirror illustrated in Figs. 10 and 11, where the retroreflective surface 23 is entirely covered by dichroic mirror coating 22, the virtual image is colored and less brilliant at all stages of the aiming operation inasmuch as that portion of the retroreflective surface disposed toward the target and away from the sun will at all times be covered by said coating. However, the form of mirror of Figs. 8 and 9, wherein mirror coating 22 covers only a part of said retroreflective surface, is similar to the form of mirror shown specifically in Figs. 1 and 2 in which split-ring type filter 27 was used. That is, that portion of said partially transparent dichroic coating which covers retroreflective surface 23 serves the same purpose as did the split-ring type filter 27 of said latter mentioned form. The observer sees a bright virtual image during the initial locating operation and, by means of a simple orientation, to be explained in detail subsequently, a colored, partially transparent and less brilliant virtual image during the "pin-pointing" operation. A brilliant, uncolored virtual image will be seen when a portion of retroreflective surface 23 not covered by mirror coating 22 is disposed toward the target T (Fig. 15) and a colored, partially transparent and less brilliant virtual image will be seen when a covered portion is so disposed (Fig. 16). Similarly to the filter of the form of Figs. 1 and 2, that portion of dichroic mirror coating 22 which covers retroreflective surface 23 may take on any shape or shapes which at least partially cover said surface.

The forms of signaling mirror of Figs. 12 and 14 are further simplifications of signaling mirrors constructed in accordance with this invention. In each of these forms, the dichroic mirror coating 22 is extended over the entire area of either the first or second surface of transparent glass sheet 21. The advantages in manufacture and assembly are apparent in that the necessity of forming a window in said coating as well as aligning the washer and retaining plate accurately within the periphery of said window are eliminated. That is, the button-like projection may be randomly located on the back of mirror 20.

In the form of Fig. 12, the button-like projection, comprising retroreflective surface 23, washer 25 and retaining plate 26, is disposed over and in back of a second surface dichroic mirror 20 and located at random on the mirror coating 22 of said second surface mirror. Inasmuch as said coating covers sighting aperture 24 of the retroreflective surface, certain of the sun's rays A, after being retroreflected as at C by retroflective surface 23 so as to be transmitted twice through the dichroic mirror coating (Fig. 16), will be transmitted through the coating a third time after being reflected from the first surface of the mirror and before passing through said sighting aperture 24. The virtual image thus presented to the eye of the observer will appear blue, as represented by the curve $T^3$ in the graph of Fig. 19, and of a darker shade than the blue represented by curve $T^2$.

Figure 17:
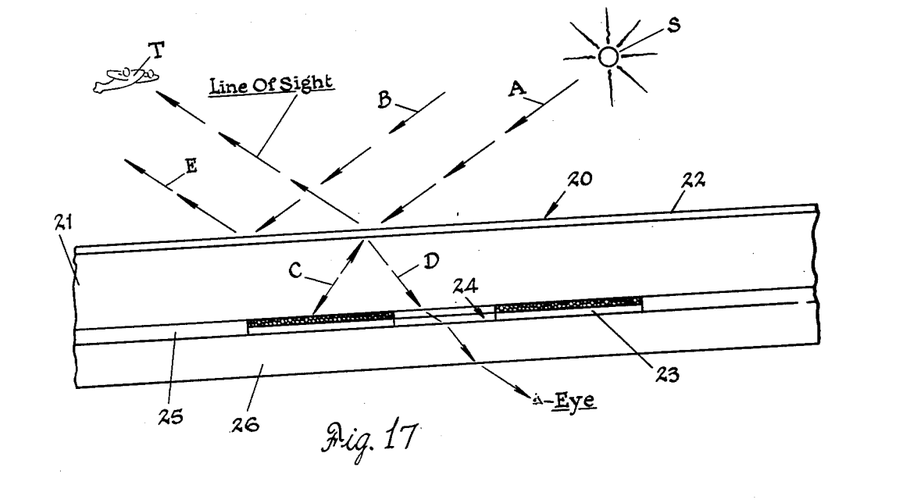

In the form of Fig. 14, the button-like projection is disposed in back of a first surface dichroic mirror 20 and located at random on the second surface of said mirror. Thus, as shown in Fig. 17, certain of the sun's rays A prior to striking retroreflective surface 23 are transmitted through the dichroic mirror coating 22 on the first surface of the mirror and upon being retroreflected as at C by said retroreflective surface, will be reflected from the dichroic coating as at D before passing through the sighting aperture 24 to the eye of the observer. The virtual image presented thereby will appear as an even different color, as represented by the curve RT in the graph of Fig. 19, and is only about 15% of the sun's actual brightness.

The form of signaling mirror of Fig. 13 is a further example of the manner in which a first surface dichroic mirror may be used. In this case, window 28 in dichroic mirror coating 22 conforms to and is aligned with sighting aperture 24 in retroreflective surface 23 over and in back of said mirror.

Thus, Figs. 1 to 14 are illustrative of the variety of forms of signaling mirrors which may be constructed in accordance with this invention. When a red reflecting dichroic mirror having the spectral characteristics illustrated in the graph of Fig. 19 is used, the signal reflected to the target is red in all of the forms (as per R) and the sky and target, as seen by the observer directly through the partially transparent dichroic mirror as shown in Fig. 18, appear as blue-green (as per T). At the same time, when aimed and oriented in a manner to be described, certain of the different forms of signaling mirrors permit the observer to see a virtual image of one of a variety of partially transparent colors different from the blue-green transmitted through the mirror.

It is believed that the advantages to be derived from the novel features of this improved signaling mirror can be more fully appreciated when the foregoing is taken in connection with the description to follow and illustrations of Figs. 15 to 18. The signaling mirror is held by the observer such that the front surface of the dichroic mirror 20 is facing toward the sun S and target T and the button-like projection of the aiming apparatus at the back of the mirror is facing toward the observer and away from the sun and target. At this stage, the mirror is held about an inch from an eye of the observer and, by means of the partial transparency of the mirror, the observer looks directly through the mirror with the other eye and orients said mirror such that the axis of the sighting aperture 24 through retroreflective surface 23 is approximately between the target and the sun and on a line therebetween.

As the observer now looks through the sighting aperture with the first-mentioned eye, a virtual image of the sun appears therein and the mirror is oriented slowly back and forth so as to bring the target into the observer's line of sight through the sighting aperture. The other eye aids in quickly following a moving target by direct vision through the partially transparent mirror coating 22. At this time then, both the target and the virtual image of the sun can be seen through the sighting aperture such that said image can be approximately superimposed upon the target. Of course, when the virtual image has been more accurately superimposed upon the target by further orientation of the mirror, the colored signal is reflecting onto the target by means of ray E and others similar and parallel thereto, in a manner well known in the signaling mirror art.

As mentioned previously, during the initial orientation step as the mirror is manipulated so as to bring the target into the observer's line of sight through sighting aperture 24 and the virtual image or aiming spot is being approximately superimposed upon said target, better results are obtained with a brilliant uncolored spot. That is, it has been found that under ordinary conditions, a colored and less brilliant virtual image is difficult to see against the sky. Also, it is advantageous to allow maximum visibility during this step, in which the target is initially located, by eliminating the colored effects of the filter or dichroic mirror coating. On the other hand, when the virtual image or aiming spot has been approximately superimposed upon the target, it has been found advantageous to "pin-point" or center the spot on the target with a colored, partially transparent and less brilliant virtual image of the sun, through which the details of the target may be seen. Thus, the forms of signaling mirror of Figs. 1 and 2 and 8 and 9, wherein retroreflective surface 23 is only partially covered, have advantages in addition to those forms in which said retroreflective surface is entirely covered. That is, by means of the adjacent covered and uncovered portions of the retroreflective surface 23, the observer is able to initially locate the mirror using a brilliant and uncolored aiming spot and to accurately superimpose a colored and less brilliant spot on the target.

In the case of the above noted forms of signaling mirrors of Figs. 1 and 2 and 8 and 9, a slightly different procedure is followed. When initially facing the mirror as noted previously, the observer must also see that an uncovered portion of retroreflective surface 23 is disposed toward the target and away from the sun, as in Fig. 15. When the mirror is so disposed, as has been previously explained, the virtual image seen by the observer through sighting aperture 24 is brilliant and uncolored inasmuch as certain of the sun's rays which are retroreflected to the eye of the observer strike neither the split-ring type colored filter 27, in the case of the form of Figs. 1 and 2, nor the dichroic mirror coating 22 in the case of the form of Figs. 8 and 9. When the mirror has been oriented such that a brilliant, uncolored aiming spot is approximately superimposed upon the target, the mirror is turned on the axis of the sighting aperture such that an adjacent covered portion of retroreflective surface 23 is disposed toward the target and away from the sun, as in Fig. 16. Thus, the brilliant uncolored virtual image is changed to a less brilliant, partially transparent color. At this time, the aiming spot can be "pin-pointed" or accurately superimposed upon the target.

It will be noted with respect to the turning of the mirror on the axis of sighting aperture 24 in order to change the virtual image from a brilliant uncolored spot to a less brilliant partially transparent colored one, that the edges of split-ring filter 27 or mirror coating 22 between the adjacent covered and uncovered portions of retroreflective surface 23 are disposed in non-parallel relation with respect to the edges of mirror 20 so that only a slight turning is necessary to bring about the change above noted. Thus, at the completion of the turning on the axis of sighting aperture 24, at which time the virtual image is accurately superimposed upon the target and a signal is being reflected thereto, the mirror is in a horizontally disposed position enabling it to be more conveniently held by the observer for extended lengths of time.

A still further specific type of signaling mirror, contemplated by this invention and to be operated in the manner described, may include a partially transparent mirror formed by depositing a thin single film coating of copper of a thickness of 0.011 micron on a surface of glass sheet 21 by thermal evaporation in a high vacuum. A mirror made in this manner showed a reflectivity in visible light of 20% and a light transmission of 53%. The light so reflected was found not to be a coppery color but rather a blue color, resulting from light interference effects and selective color reflection of light jointly. The color as seen by transmission was of a light pinkish brown resulting after the reflection above noted and as further modified by selective light absorption.

This single film coating provides an excellent mirror for use with the various forms of signaling mirrors disclosed. With particular reference to the forms shown in Figs. 1 to 11 and 13, a window of any desired area may easily be provided in the mirror by removing the coating from the area by ammonia or by masking said area in any suitable manner during application of the coating.

It was found necessary, when conventional aluminum or silver backed mirrors were used for signaling mirrors of this type, to place on the back of said aluminum or silver an additional coating for protection against salt spray and other similar corrosive effects. However, the dichroic mirror coating employed herein is itself resistant to such effects and a protective coating is unnecessary.

It is to be understood that the forms of the invention disclosed herein are to be taken as the preferred embodiments thereof, and that various changes in the shape, size and arrangement of parts may be resorted to without departing from the spirit of the invention or the scope of the following claims.

I claim:

1. A visually transparent signaling mirror device for reflecting sunlight to a desired target, comprising a transparent support, a visually transparent, partially reflective mirror coating on a surface of said support for providing a forwardly reflected light signal, a retroreflective element of reduced light transmission located on the back of said support within the area of and bordered by the said support and cooperating with a forwardly spaced surface of said support to reflect a virtual image of the sun to the eye, and reference means comprising a clear area within said retroreflective element for superimposing the said virtual image as seen through said clear area, upon said target to aim said reflected light signal from said mirror coating upon said target, said transparent mirror coating providing direct vision therethrough of the entire sky field so as to facilitate the following of the said target while aligning the said virtual image and reflected light signal with said target.

2. A visually transparent signaling mirror device as described in claim 1, in which the visually transparent, partially reflective mirror coating reflects a colored light signal.

3. A visually transparent signaling mirror device as described in claim 1, in which the visually transparent, partially reflective mirror coating is a dichroic colored mirror.

4. A visually transparent signaling mirror device as described in claim 1, in which a clear open space is provided in the said visually transparent, partially reflective mirror coating and in which the said retroreflective element is located in back of said open space.

5. A visually transparent signaling mirror device as described in claim 4, in which a colored filter is arranged between said open space and retroreflective element and covers a portion of said retroreflective element.

6. A visually transparent signaling mirror device as described in claim 1, in which there is provided a clear open space in said visually transparent, partially reflective mirror coating in which said retroreflective element is located in back of the clear open space, and in which the reference means includes an aperture therein registering with said clear open space.

7. A visually transparent signaling mirror device as described in claim 6, in which a colored filter is arranged between said open space and retroreflective element and covers a portion of said retroreflective element.

References Cited in the file of this patent

UNITED STATES PATENTS

| Number | Name | Date |
|---|---|---|
| 183,443 | Alt | Oct. 17, 1876 |
| 1,278,302 | Campbell | Sept. 10, 1918 |
| 1,676,760 | Wilson | July 10, 1928 |
| 1,846,054 | Hochstetter | Feb. 23, 1932 |
| 2,379,790 | Dimmick | July 3, 1945 |
| 2,381,728 | Dimmick | Aug. 7, 1945 |
| 2,392,978 | Dimmick | Jan. 15, 1946 |
| 2,403,685 | Sachtleben | July 9, 1946 |
| 2,412,496 | Dimmick | Dec. 10, 1946 |
| 2,412,616 | Hunter | Dec. 17, 1946 |
| 2,504,982 | Hunter | Apr. 25, 1950 |
| 2,519,546 | Colbert | Aug. 22, 1950 |
| 2,557,108 | Hunter | June 19, 1951 |
| 2,589,618 | Learned | Mar. 18, 1952 |